3,179,498
RECOVERY OF BROMINE BY THE NITRITE
CATALYTIC OXIDATION OF BROMIDE ION
IN AN ACID MEDIUM
William A. Harding, Bortondale, Media, Pa., and Saul Gerald Hindin, Wilmington, Del., assignors, by direct and mesne assignments, of one-half to Air Products and Chemicals, Inc., Philadelphia, Pa., a corporation of Delaware, and one-half to Northern Natural Gas Company, Omaha, Nebr., a corporation of Delaware
No Drawing. Filed Dec. 2, 1963, Ser. No. 327,521
9 Claims. (Cl. 23—216)

This invention relates to the recovery of bromine and, more particularly, to a process for the recovery of bromine by the catalytic oxidation of bromide ion.

Oxidation reactions (displacement) using chlorine as the oxidant have found commercial acceptance in the major areas of bromine production, such as in the recovery of bromine from relatively large volumes of sea water. However, where the bromine component is present in percentages higher than those normally found in sea water certain economic and procedural advantages may be obtained by the use of oxygen as the oxidant in bromine recovery systems.

Although favored thermodynamically, in practice the oxidation of bromide ion to bromine using molecular oxygen proceeds very slowly leading some investigators to state that no reaction occurs. In view of the extremely impractical rate of the uncatalyzed reaction, a considerable amount of effort has gone into a search for appropriate catalysts and catalytic methods for obtaining an accelerated oxidative reaction employing molecular oxygen. Perhaps the best agents heretofore suggested, which exhibit some catalytic activity for such reactions, have been the oxides of nitrogen, but such catalysts are only moderately effective in accelerating the reaction. Accordingly, at the present time no oxygen-using system even approaches commercial acceptance.

An object of the present invention is to provide a commercially practical method for the recovery of bromine by the catalytic oxidation of bromide ion in the presence of molecular oxygen.

Another object of the invention is to provide methods for accelerating catalyzed oxidation reactions which employ molecular oxygen for the conversion of bromide ion to bromine.

In accordance with one embodiment of the present invention, bromide ion and a nitrite catalyst in acidic, aqueous solution are contacted with an oxygen-containing gas at a temperature between 0 to 100° C. and at ambient pressure to release free bromine. By increasing the pressure, higher temperatures may be employed. For example, temperatures up to 200° C. may be utilized when the pressure has been increased to about 250 lbs./sq. in.

The nitrite catalyst may comprise any inorganic or organic nitrite. Particularly suitable inorganic nitrite materials include alkaline earth metal and alkali metal nitrites, such as potassium nitrite. Of the organic nitrites, alkyl nitrites, such as butyl nitrite, are especially suited as catalysts. The catalyst concentration is preferably maintained in the range of 0.01 to 10.0 M (molar) in an acidic, aqueous solution in which the acid (proton) concentration may be between 0.5 to 20 equivalents preferably in the range of 2.0 to 8.0 equivalents. The optimum concentration of acid is related to the bromide concentration of the solution which is generally above 1 M. Preferably, the bromide ion is in the range of 2.8 M to the limit of solubility of the bromide ion source compound in the solution and the acid concentration will vary according to bromide concentration. The nature of the acid medium, however, is not critical and acids such as sulfuric, phosphoric and trichloroacetic acid may be employed. Pure oxygen is not required for the oxidation and, in fact, air cannot only be used but is preferred as the oxygen-containing gas.

Although the equation for the chemical oxidation of bromide ion to molecular bromine using air or oxygen:

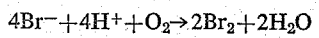

suggests that the effect of pressure would be deleterious to the reaction since two moles of bromine gas are formed from one mole of oxygen, actually the bromine formed is soluble in the bromide solution thereby decreasing the vapor pressure of the bromine formed. As a result, the effect of pressure in the reaction is to drive the reaction more nearly to completion or at least towards equilibrium.

Both an increase in pressure and/or temperature are effective in increasing the rate of the desired reaction within certain limits. At subatmospheric pressures the reaction occurs but at lower rates. The rate of reaction favorably increases with an increase in pressure; equipment and economic factors establish the practical upper limit of pressure. Temperatures should not reach the critical point of the solution at the existing pressure conditions.

Free bromine, resulting from the described reaction, of molecular oxygen and bromide in presence of a nitrite catalyst, dissolves in and increases in concentration in the solution media. Any of the several known and acceptable methods for the separation and recovery of the free bromine from the mother solution can be employed and these methods do not form a part of this invention per se. Included in the known systems of separation and recovery is the steam or air blow treatment of bromine-rich liquor in separate chambers from those in which the oxidative reaction is occurring. Bromine removed by such blowing operations may be recovered either as free bromine or more usually as the reaction product with a suitable alkaline-type compound which is available thereafter for conversion, transportation or utilization in any desirable or practical form.

The invention is further clarified by the following examples:

EXAMPLE I

The runs reported in Table 1 indicate the effect of bromide ion concentration and were carried out according to the following procedure in apparatus suitably designed and constructed for batch-type operation.

The appropriate bromide material in its acidic menstruum was placed in the reaction zone and suitably agitated to insure both good mixing of liquid phase material as well as good contact of liquid and gaseous components of the reaction system. While maintaining an oxygen atmosphere at a pressure of approximately atmospheric plus 100 mm. Hg in the reaction zone potassium nitrite was introduced. As the reaction progressed the pressure in the reaction zone was maintained constant by controlled introduction of additional oxygen. Rates of reaction were determined periodically by measurement of oxygen uptake and/or analysis of the bromide content of representative samples of the reaction media—the results of both methods were in agreement in all duplicated instances.

*Table 1*

| Run | HBr Solution (Molarity) | Potassium Nitrite (Moles) | Temp. (° C.) | Moles of Bromine Formed | | |
|---|---|---|---|---|---|---|
| | | | | 10 min. | 20 min. | 30 min. |
| A | 1.0 | 0.033 | 30 | .006 | .008 | |
| B | 2.0 | 0.033 | 30 | .016 | .023 | .030 |
| C | 2.8 | 0.033 | 30 | .032 | .057 | .076 |
| D | 4.0 | 0.033 | 30 | .040 | .069 | .093 |
| E | 4.8 | 0.033 | 30 | .043 | .073 | .100 |
| F | 6.0 | 0.033 | 30 | .042 | .080 | .104 |
| G | 7.7 | 0.033 | 30 | .034 | .063 | .083 |

EXAMPLE II

Utilizing the procedure of Example I the following results were obtained employing temperatures of 30° C. and potassium nitrite (0.033 M) as the catalyst.

*Table 2*

| Run | Br⁻ concentration (moles/liter) | H⁺ concentration (equivalents/liter) | Moles of Bromine Formed | | |
|---|---|---|---|---|---|
| | | | 10 min. | 20 min. | 30 min. |
| H | ᵃ 4.0 | 1.0 | .022 | .036 | .042 |
| I | ᵃ 4.0 | 2.0 | .038 | .067 | .080 |
| J | ᶜ 4.0 | 4.0 | .037 | .073 | .101 |
| K | ᵇ 4.0 | 5.0 | .040 | .066 | .088 |
| L | ᵇ 4.0 | 6.0 | .035 | .064 | .087 |
| M | ᵇ 4.0 | 8.0 | .034 | .063 | .087 |
| N | ᵇ 4.0 | 12.0 | .021 | .046 | .066 |
| O | ᵇ 4.0 | 20.0 | .023 | .045 | .064 |
| P | ᵃ 1.0 | 4.0 | .012 | | |
| Q | ᵃ 2.4 | 4.0 | .028 | .054 | .072 |

ᵃ KBr and H₂SO₄.
ᵇ HBr and H₂SO₄.
ᶜ HBr.

These data indicate the effect of the acid equivalent present during the reaction. At H⁺ concentrations above and below the 2 N to 8 N range effective results may be obtained, but yields are lower and undesirable side effects, particularly with higher acid concentrations, make such concentrations less desirable. Improved results are obtained even when the bromide ion is in the low range of concentration (Runs P and Q) if sufficient acid equivalents are present.

EXAMPLE III

Following the procedure of Example I, the nitrite concentration was varied for the runs illustrated by Table 3 while the bromide ion concentration was maintained, initially, constant at 4 molar.

*Table 3*

| Run | Nitrite (Millimoles) | Solution Molarity | Moles of Bromine Formed | | |
|---|---|---|---|---|---|
| | | | 10 min. | 20 min. | 30 min. |
| R | ¹ 1.0 | 0.003 | .003 | .006 | .008 |
| S | ¹ 5.0 | 0.016 | .014 | .028 | .040 |
| T | ¹ 10.0 | 0.033 | .040 | .069 | .093 |
| U | ¹ 20.0 | 0.064 | .091 | .157 | |
| V | ² 1.0 | 0.003 | .004 | .008 | |
| W | ² 5.0 | 0.016 | .021 | .038 | |
| X | ² 10.0 | 0.033 | .052 | .086 | .113 |
| Y | ² 20.0 | 0.064 | .111 | .179 | |

¹ Potassium nitrite.
² Butyl nitrite.

These data indicate the effect of nitrite concentration and show the effectiveness of both organic and inorganic nitrites.

When Run T is substantially duplicated except that air is substituted for pure oxygen and the pressure is adjusted to give an equivalent oxygen partial pressure, an increase in bromine formation is obtained—probably because of an effect of pressure.

EXAMPLE IV

Using a system such as in Example I, 4 M HBr solution and 0.033 M nitrite solution were used as the starting materials for examination of the effect of temperature and pressure variations. Table 4 shows the results obtained when the temperature was changed while pressure was held constant at atmospheric plus 100 mm. Hg.

*Table 4*

| Temperature (° C.) | Moles of Bromine Formed | | |
|---|---|---|---|
| | 10 min. | 20 min. | 30 min. |
| 30 ¹ | .040 | .069 | .093 |
| 40 ¹ | .059 | .102 | |
| 50 ¹ | .093 | .161 | |
| 30 ² | .052 | .086 | .113 |
| 40 ² | .083 | .131 | |
| 50 ² | .104 | .175 | |

¹ Potassium nitrite.
² Butyl nitrite.

Table 5 illustrates the effect of pressure when temperature was held constant at 30° C.

*Table 5*

| Pressure (Atmospheres) | Moles of Bromine Formed | | |
|---|---|---|---|
| | 10 min. | 20 min. | 30 min. |
| 1+100 mm. Hg | .040 | .069 | .093 |
| 1+500 mm. Hg | .072 | .093 | |
| 3 | .105 | .163 | |

The foregoing material is illustrative of practical operations for the preparation of free bromine in nitrite-catalyzed systems. It has been found that the reaction mechanism can be further promoted, i.e., accelerating the rate of oxidation, by the addition of minor amounts of materials such as activated carbon and carbonaceous compounds liquid at the encountered reaction conditions. Such carbonaceous materials include alkanes; alkenes; aromatic nucleus hydrocarbons; and halogenated, preferably chlorinated, hydrocarbons. Moreover, water soluble carbonaceous materials such as methyl alcohol are effective. These materials have been found to be particularly effective when present in from trace amounts up to 0.02% by weight as carbon based on the total weight of the bromide-nitrite moiety of the reaction system.

EXAMPLE V

The effect of various additives in a system similar to that described for Example I and particularly for Run D in Table 1, is shown in the following table.

*Table 6*

| Additive | Amount | Moles of Bromine Formed | |
|---|---|---|---|
| | | 10 min. | 20 min. |
| None | 0 | .040 | .069 |
| Carbon tetrachloride | 1 ml | .036 | .065 |
| Do | 2 ml | .049 | .086 |
| Do | 5 ml | .072 | .121 |
| Do | 10 ml | .091 | .133 |
| n-Octane | 3.4 ml | .060 | .099 |
| n-Octane | 3.3 ml | .060 | .089 |
| Benzene | 1.9 ml | .056 | .095 |
| Activated carbon | 1 gm | .066 | .105 |

EXAMPLE VI

In a typical commercial scale operation, a 4 molar solution of potassium bromide in a 3.7 molar sulfuric acid aqueous solution is agitated in a closed reaction vessel with potassium nitrite catalyst (approximately 11.8 mmoles) in the presence of an atmosphere of air maintained at a pressure of four atmospheres. The reaction temperature is autogenic and varies slightly between ambient temperature and about 50° C. The reaction is continued until the rate of oxygen uptake as indicated by the amount of air introduced to maintain the stated pressure is less than about 1% wt. of oxygen per hour per weight of original bromide.

The vessel is depressured to atmospheric pressure through a series of absorber towers and countercurrent to sodium carbonate solution in the towers. The liquid in the reaction vessel is air blown and the air plus bromine are vented through the absorber train. The air blow is stopped when the amount of bromine in the vented air falls to less than 10 parts per million. The absorber liquid may serve for treatment of additional batches but in any event when the alkalinity approaches 7.4 pH its use in the absorber is discontinued and the solution is transferred for treatment with sulfuric acid to liberate the sorbed bromine. In the present example free bromine is recovered in about 95% of the bromide ion originally charged.

Obviously, many modifications and variations of the invention as hereinbefore set forth may be made without departing from the spirit and scope thereof and therefore only such limitations should be imposed as are indicated in the appended claims.

What is claimed is:

1. The process for the recovery of bromine by the catalytic oxidation of bromide ion which comprises contacting a mixture of bromide ion and a nitrite catalyst in an acid medium with an oxygen-containing gas at a temperature of 0 to 200° C. and separating free bromine formed by the oxidation of the bromide ion from the reaction media.
2. The process of claim 1 in which the nitrite catalyst concentration is in the range of 0.01 to 10.0 M.
3. The process of claim 2 in which the catalyst is potassium nitrite.
4. The process of claim 2 in which the catalyst is butyl nitrite.
5. The process of claim 1 in which the acid concentration is 0.5 to 20 equivalents per liter.
6. The process of claim 1 in which the oxygen-containing gas is air.
7. The process for the recovery of bromine by the catalytic oxidation of bromide ion, which comprises contacting a mixture of bromide ion and a nitrite catalyst in an acid medium with an oxygen-containing gas in an agitated reactor maintained at a temperature between 0 to 200° C. and separating free bromine formed by the oxidation of the bromide ion from the reaction media.
8. The process for the recovery of bromine by the catalytic oxidation of bromide ion which comprises reacting a mixture of bromide ion and nitrite catalyst in an acid medium with an oxygen-containing gas at a temperature of 0 to 200° C. and separating free bromine formed by said oxidation from the reaction media, said catalyst being present in a concentration ranging from 0.01 to 10.0 M and wherein the acid concentration is 0.5 to 20 equivalents per liter.
9. The process for the recovery of bromine by the catalytic oxidation of bromide ion which comprises contacting a mixture of bromide ion and a nitrite catalyst in an acid medium with an oxygen-containing gas in a reaction vessel, adding to the vessel a minor amount of a carbonaceous additive suitable for accelerating the reaction rate of the catalytic oxidation, maintaining said vessel at a temperature of 0 to 200° C. and separating free bromine formed by the oxidation of the bromide ion from the reaction media.

References Cited by the Examiner

UNITED STATES PATENTS

| 2,855,279 | 10/58 | Walter | 23—219 |
| 3,131,028 | 4/64 | Stow | 23—219 X |

FOREIGN PATENTS

| 796,049 | 6/58 | Great Britain. |
| 930,341 | 7/63 | Great Britain. |

MAURICE A. BRINDISI, *Primary Examiner.*

UNITED STATES PATENT OFFICE
CERTIFICATE OF CORRECTION

Patent No. 3,179,498                            April 20, 1965

William A. Harding et al.

It is hereby certified that error appears in the above numbered patent requiring correction and that the said Letters Patent should read as corrected below.

Column 4, Table 6, under the column heading "Additive", line 7 thereof, for "n-Octane" read -- n-Octene --.

Signed and sealed this 21st day of December 1965.

(SEAL)
Attest:

ERNEST W. SWIDER                           EDWARD J. BRENNER
Attesting Officer                               Commissioner of Patents